(12) United States Patent
Paredes

(10) Patent No.: US 9,950,942 B2
(45) Date of Patent: Apr. 24, 2018

(54) BOTTLE WITH VENTED NECK

(71) Applicant: Owens-Brockway Glass Container Inc., Perrysburg, OH (US)

(72) Inventor: Raul M. Paredes, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 0 days.

(21) Appl. No.: 13/709,288

(22) Filed: Dec. 10, 2012

(65) Prior Publication Data

US 2014/0158659 A1 Jun. 12, 2014

(51) Int. Cl.
| | |
|---|---|
| C03B 9/325 | (2006.01) |
| B65D 23/00 | (2006.01) |
| B65D 1/02 | (2006.01) |
| C03B 9/16 | (2006.01) |
| C03B 9/193 | (2006.01) |
| C03B 9/32 | (2006.01) |

(52) U.S. Cl.
CPC .............. *C03B 9/325* (2013.01); *B65D 1/023* (2013.01); *B65D 1/0246* (2013.01); *B65D 23/00* (2013.01); *C03B 9/165* (2013.01); *C03B 9/1932* (2013.01); *C03B 9/32* (2013.01)

(58) Field of Classification Search
CPC ................................. C03B 9/32; C03B 9/325
USPC .......................................................... 65/68
See application file for complete search history.

(56) References Cited

U.S. PATENT DOCUMENTS

| | | | | |
|---|---|---|---|---|
| 763,973 | A | * | 7/1904 | Flynn ............................ 222/572 |
| D92,953 | S | * | 8/1934 | Gaynor ......................... 215/382 |
| 2,006,041 | A | * | 6/1935 | Darling ......................... 249/142 |
| 2,289,046 | A | | 7/1942 | Rowe |
| 2,336,822 | A | * | 12/1943 | Wadman ............. B29C 49/6436 215/382 |
| 3,271,127 | A | | 9/1966 | Wendle |
| 3,468,648 | A | * | 9/1969 | Nowak ................. C03B 9/1932 215/400 |
| 3,881,622 | A | | 5/1975 | Dockery |
| 3,956,441 | A | * | 5/1976 | Uhlig ............................ 264/530 |
| 4,137,061 | A | | 1/1979 | Mallory et al. |
| 4,362,544 | A | | 12/1982 | Mallory |
| 4,649,068 | A | | 3/1987 | Collette |
| 5,366,774 | A | | 11/1994 | Pinto et al. |
| D400,106 | S | | 10/1998 | Anderson et al. |
| D408,289 | S | | 4/1999 | Swette et al. |
| 6,079,226 | A | | 6/2000 | Leidy |

(Continued)

FOREIGN PATENT DOCUMENTS

| | | |
|---|---|---|
| DE | 289564 | 1/1916 |
| EP | 2679548 | 1/2014 |

(Continued)

OTHER PUBLICATIONS

Int Search Report and Written Opinion of the Int. Searching Authority, PCT Serial No. PCT/US2013/070255, PCT Filing Date: Nov 15, 2013, Applicant: Owens-Brockway Glass Container Inc., dated Mar. 13, 2014.

*Primary Examiner* — Cynthia Szewczyk (57) ABSTRACT

A glass bottle includes a body having a closed end, a shoulder spaced from the end, a neck extending from the shoulder, and a neck finish at an end of the neck for attachment of a closure, characterized in that the neck finish and at least a portion of the neck adjacent to the neck finish have non-circular internal surfaces.

21 Claims, 9 Drawing Sheets

(56) References Cited

U.S. PATENT DOCUMENTS

| | | |
|---|---|---|
| 6,085,949 A | 7/2000 | Zimny |
| D433,946 S | 11/2000 | Rollend et al. |
| D508,409 S * | 8/2005 | Hewson .......................... D9/561 |
| 7,976,767 B2 | 7/2011 | Ungrady et al. |
| 2009/0084799 A1 | 4/2009 | Mondon |
| 2010/0181278 A1* | 7/2010 | Martin ................... B65D 1/023 |
| | | 215/40 |
| 2010/0264107 A1 | 10/2010 | Lonsway et al. |
| 2010/0270260 A1 | 10/2010 | Jung |
| 2011/0114596 A1 | 5/2011 | Jung |
| 2012/0000878 A1 | 1/2012 | Reisig |

FOREIGN PATENT DOCUMENTS

| | | |
|---|---|---|
| GB | 02886 | 8/1910 |
| GB | 225951 | 12/1924 |
| GB | 499621 | 1/1939 |
| WO | 9212901 | 8/1992 |

* cited by examiner

BOTTLE WITH VENTED NECK

The present disclosure is directed to containers and, more particularly, to bottles.

BACKGROUND AND SUMMARY OF THE DISCLOSURE

Bottles typically include a body having a shoulder, a neck finish and a neck extending between the shoulder and the neck finish. U.S. Patent Application Publication 2012/0000878 illustrates an example glass bottle of this general type. Such bottles may be produced using a blow-and-blow manufacturing process or a press-and-blow manufacturing process, and typically have substantially uniform wall thicknesses.

In a typical blow-and-blow manufacturing process, a gob of molten glass is dropped into a blank mold having a neck ring at its bottom end, and a baffle applied over an open top end of the blank mold. Then, a settle blow or vacuum is applied to the glass gob to force the molten glass of the gob into the neck ring and against a short plunger within the neck ring. Subsequently, the plunger is retracted and a counter blow is applied through the neck ring around the plunger to blow a cavity in the molten glass and expand the molten glass against inside surfaces of the blank mold to form a parison. Next, the baffle is removed, the blank mold is opened, and the inverted parison is flipped to an upright position held by the neck ring wherein a blow mold is closed around the parison. A final blow is applied through the bore of the neck ring into the parison cavity to stretch the parison into contact against inside surfaces of the blow mold to form the bottle. U.S. Pat. No. 4,137,061 illustrates an example blow-and-blow process of this general type.

In a typical press-and-blow manufacturing process, a molten glass gob is dropped into a blank mold including a neck ring, and a long plunger is pressed into the molten glass gob to form a parison. The parison includes a parison neck formed by the neck ring, and a body having a cavity formed by outer surfaces of the plunger and outer surfaces formed against inside surfaces of the blank mold. The parison is then removed from the blank mold and placed in a blow mold, in which blow gas is applied through a bore of the neck ring into the parison cavity to stretch the body and a major portion of a neck of the parison into contact against inside surfaces of the blow mold while the neck finish remains in the geometry formed in the blank mold. U.S. Pat. No. 2,289,046 illustrates an example wide mouth press-and-blow process, and U.S. Pat. No. 3,271,127 illustrates an example narrow neck press-and-blow process.

Moreover, longneck bottles are popular in the beverage packaging industry, particularly for packaging beer. U.S. Patent Application Publication 2010/0264107 illustrates example longneck bottles having necks with internal ribs produced by forming external ribs on parison necks and pushing the external ribs into the necks during blowing of the parisons into the bottles.

A general object of the present disclosure, in accordance with one aspect of the disclosure, is to provide a bottle having improved product dispensing flow via a vented neck that does not require unconventional neck ring equipment, unconventional blank or blow mold bodies, or an unconventional closure design for the container, and related methods and tooling.

The present disclosure embodies a number of aspects that can be implemented separately from or in combination with each other.

A method of a making a glass bottle in accordance with one aspect of the disclosure includes the steps of: (a) forming a parison from a gob of molten glass around a plunger in a blank mold having a neck ring, wherein the parison includes a body, and a neck having a neck finish and a neck interior, and wherein at least a portion of the plunger has a non-circular cross-section to form the neck interior with a corresponding non-circular cross-section; and (b) blowing the parison in a blow mold to form the bottle, which has the neck interior of non-circular cross-section.

In accordance with another aspect of the disclosure, there is provided a bottle that includes a body having a closed end, a shoulder spaced from the end, a neck extending from the shoulder, and a neck finish at an end of the neck for attachment of a closure, characterized in that the at least a portion of the neck adjacent to the neck finish has non-circular internal surfaces.

In accordance with a further aspect of the disclosure, there is provided a method of a making a glass bottle that includes the steps of: (a) pressing a plunger into a gob of molten glass in a parison mold to form a glass parison having a body and a neck finish, and (b) blowing the parison body in a blow mold to form a bottle having the neck finish, characterized in that the plunger has a non-circular cross-section so that at least a portion of the neck finish formed in the step (a) has a non-circular cross-section that is retained during and following the step (b).

In accordance with an additional aspect of the disclosure, there is provided a plunger for a blank mold of a container manufacturing process that includes a base, a conical portion terminating in a tip, and a forming portion between the base and the tip, wherein the forming portion has a non-circular cross-section to form a container neck interior with a corresponding non-circular cross-section.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION OF PREFERRED EMBODIMENTS

Figure 1:
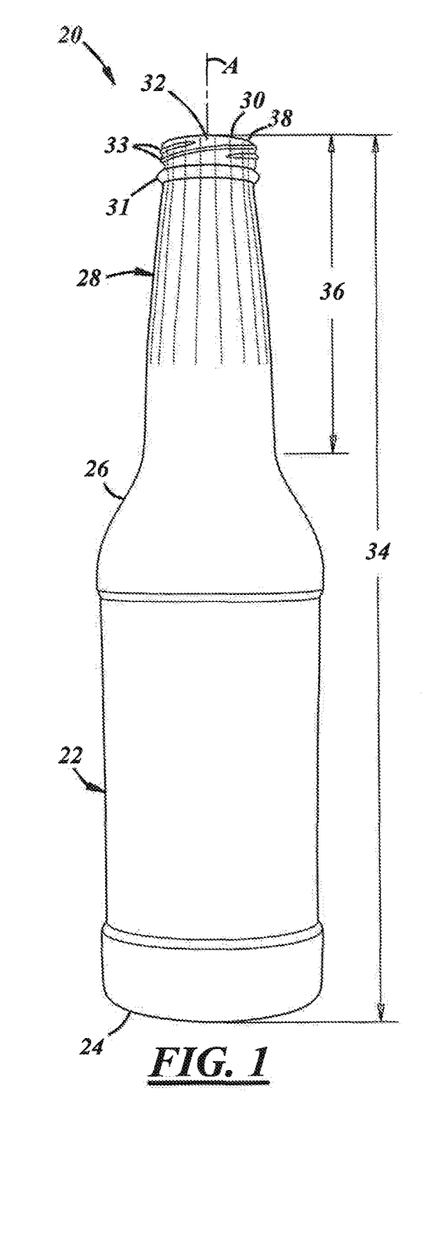
FIG. 1 is a front elevational view of a bottle having a vented neck in accordance with an illustrative embodiment of the present disclosure.
Figure 2:
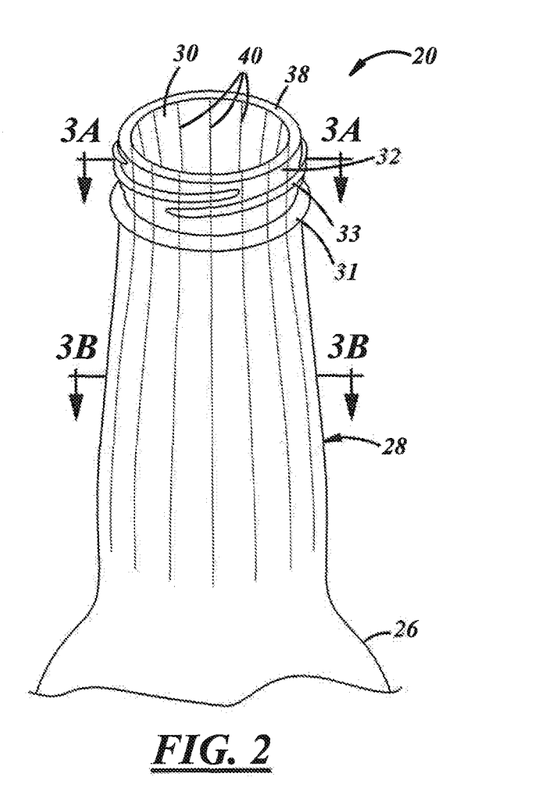
FIG. 2 is an enlarged fragmentary perspective view of the bottle of FIG. 1.
Figure 3A:
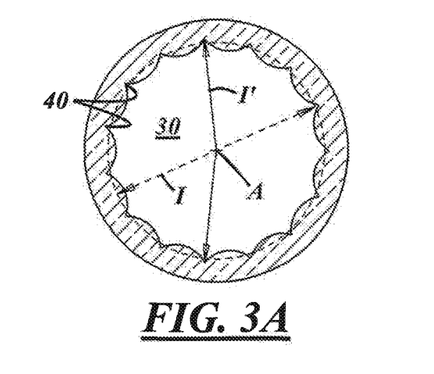
FIG. 3A is an enlarged cross-sectional view of a portion of the neck of the bottle of FIG. 1, taken along line 3A thereof.
Figures 3B, 3C, 3D:
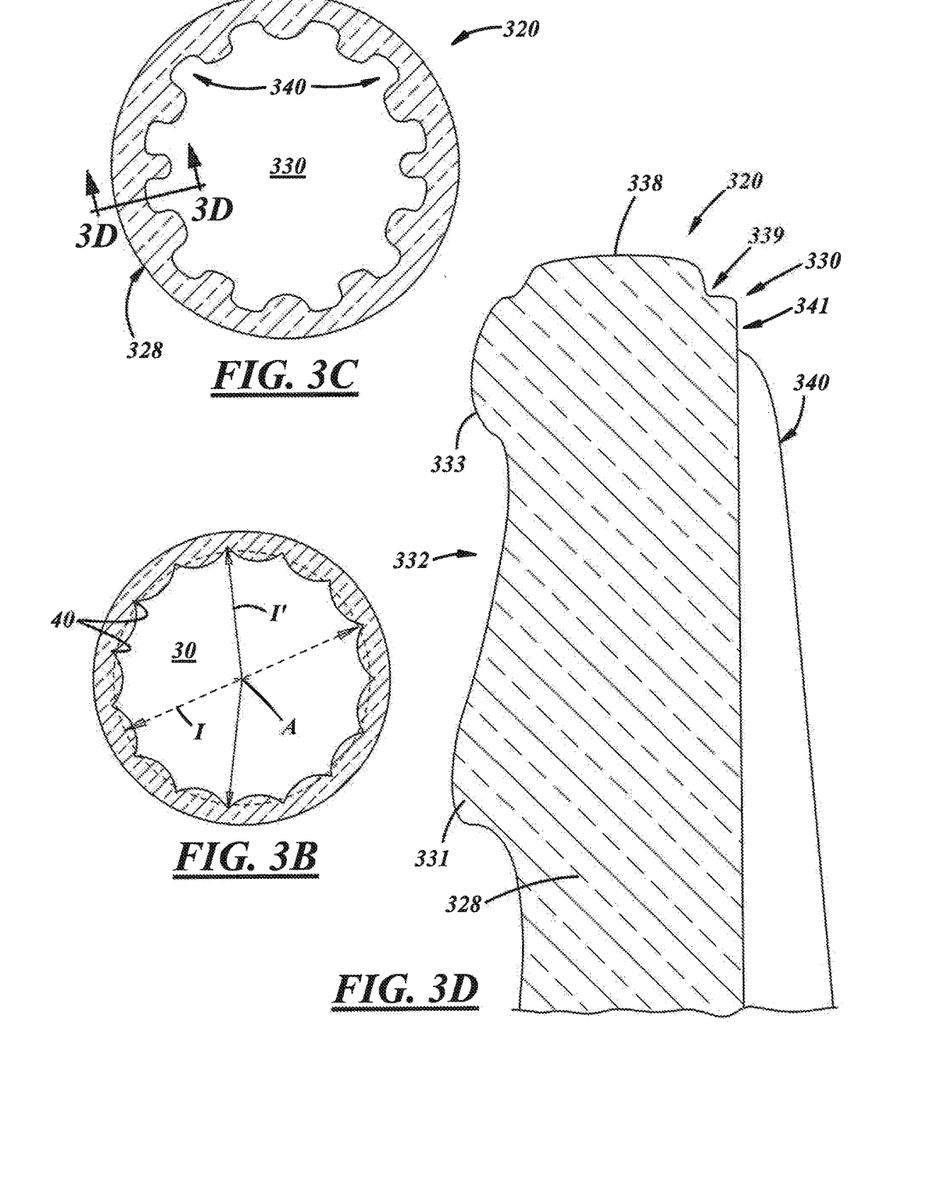
FIG. 3B is an enlarged cross-sectional view of another portion of the neck of the bottle of FIG. 1, taken along line 3B thereof.
FIG. 3C is a cross-sectional view of bottle having a vented neck in accordance with another illustrative embodiment of the present disclosure.
FIG. 3D is an enlarged fragmentary cross-sectional view of a portion of the bottle of FIG. 3C, taken along line 3D thereof.

FIG. 1 illustrates a bottle 20 in accordance with one illustrative embodiment of the present disclosure as including a bottle body 22, a closed base 24 terminating a lower portion of the body 22, a shoulder 26 extending from an upper portion the body 22, and a bottle neck 28 extending along a longitudinal central axis A of the bottle 20 from the shoulder 26 to a bottle lip 38 (FIGS. 2 and 3). The neck 28 includes a neck finish 32 that has one or more features thereon for attachment of a desired closure (not shown). For example, the neck 28 may include a capping flange 31, and one or more threads or thread segments 33 to cooperate with corresponding threads on a threaded type of closure. As used herein, the term thread segment includes whole, partial, multiple, and/or an interrupted thread and/or thread segment. The neck finish 32 can instead include a crown thereon for engagement with a crimping type of closure, or any other suitable closure features.

The bottle 20 may be a longneck bottle having an overall height 34, and the neck 28 (including neck finish 32) having a neck height 36. For purposes of the present disclosure, the term "longneck bottle" is defined as a bottle in which the height 36 of the bottle neck is at least 25% of the overall bottle height 34. In illustrative embodiments of the present disclosure, the neck height 36 is in the range of 33% to 40% of bottle height 34. The heights 34, 36 may be measured to a sealing surface 38 that axially terminates the neck 28 and neck finish 32. Also, the bottle 20 may be a narrow neck bottle, having a thread diameter (so-called "T" dimension) or a crown diameter (so-called "A" dimension) not more than 38 mm. The neck 28 and neck finish 32 may have external surfaces that are circular in cross section.

The bottle 20 is of one-piece integrally formed construction, preferably glass, metal, or plastic construction. (The term "integrally formed construction" does not exclude one-piece integrally molded layered glass constructions of the type disclosed for example in U.S. Pat. No. 4,740,401, or one-piece glass or metal bottles to which other structure is added after the bottle-forming operation.) Longneck glass bottles can be fabricated by press-and-blow and/or blow-and-blow manufacturing operations, or by any other suitable technique(s).

In accordance with the present disclosure, the bottle neck 28 is vented to include non-circular internal surfaces. For example, at least one internal axial feature is formed in the bottle neck 28 for affecting flow of liquid through the bottle neck 28 during dispensing. In embodiment, at least a portion of the neck 28 adjacent to, radially inward of, and/or axially corresponding to the neck finish 32 is vented to include the non-circular internal surfaces. As will be discussed in further detail below, the axial feature may be formed by corresponding features of a press-and-blow or blow-and-blow plunger, and does not require use of corresponding features in blank or blow molds or in neck rings. Accordingly, conventional blank molds, blow molds, and/or neck rings may be used, in conjunction with the disclosed plunger(s).

In the embodiment of FIGS. 1-3B, the bottle neck 28 is fluted. For example, the internal axial feature takes the form of a plurality of internal grooves 40 that extend axially along the axis A that forms the central axis of the bottle 20. The grooves 40 are formed into the interior surface of the bottle 20 so as to extend radially outwardly, as opposed to projections formed onto the interior surface of the bottle 20 that project radially inwardly. The grooves 40 may be substantially identical and at uniform angular or circumferential spacing from each other. As liquid product, such as beer, soda or other beverage, is dispensed from the bottle 20 out of the neck interior 30, the grooves 40 promote venting of gas into and/or out of the bottle 20. Improved venting leads to an increased liquid flow rate out of the bottle 20, for example, up to 10% better.

The configuration of the grooves 40 is such that the surface area of the opening of the neck interior 30 is substantially the same as it would be for a conventional bottle that is otherwise identical to the bottle 20 except for the grooves 40. Conventional longneck bottles have necks and neck interiors that are typically cylindrical or conical and, in any event, circular in cross-section. Bottle necks are specified by a so-called "I" dimension that is a major inside diameter of the neck interior and a so-called "E" and "T" dimensions that are major outside diameters of the neck finish and the threads, respectively. As used herein, the terminology circular neck interior means circle-shaped in cross-section perpendicular to the bottle axis A, and uninterrupted over a full circumference.

As illustrated in FIGS. 3A and 3B, the bottle 20 has anon-circular neck interior with a major inside diameter I' that is larger than a major inside diameter I of a circular neck interior of a conventional bottle, which is otherwise identical to the bottle 20 except for the grooves 40. But the circular neck finish 32 and threads 33 have "E" and "T" dimensions that are substantially the same as the conventional bottle. As used herein, the term substantially means within manufacturing tolerances commonly used in the art. Accordingly, the wall of the neck 28 and neck finish 32 may be both thinner and thicker than the thickness of conventional bottles.

Referring now to FIGS. 3C and 3D, a bottle 320 includes a neck 328 with a neck finish 332 including a capping flange 331, a crown 333, and an axial end surface or lip 338. The bottle 320 also includes a neck interior 330 and is vented, for example, by being fluted to include a plurality of grooves 340. The grooves 340 may extend axially toward the lip 338 but may stop short thereof. For example, an axial gap may be provided between the lip 338 and the axial ends of the grooves 340. Also, a stepdown or step 339 may be provided axially and radially between the lip 338 and the axial ends of the grooves 340. Likewise, a cylindrical portion 341 may be provided axially between the axial ends of the grooves 340 and the step 339.

Figure 4:
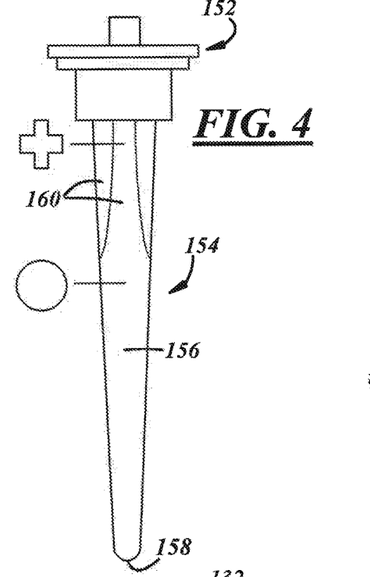
FIG. 4 is a front elevational view of a press-and-blow plunger in accordance with an illustrative embodiment of the present disclosure.

In one illustrative embodiment, and with reference to FIG. 4, a press-and-blow plunger 150 includes a base 152 and a forming body 154 extending from the base and including a smooth conical portion 156 terminating in a rounded tip 158, and a groove forming portion 160 between the tip 158 and the base 152. In a press-and-blow process, the forming body 154 forms neck, shoulder, and body interior surfaces of a parison used to form a bottle. In particular, the groove forming portion 160 is used to form grooves in the parison that ultimately become grooves in a bottle after the parison is blown into the shape of the bottle. In this example, the groove forming portion 160 has a plus-shaped or cross-shaped cross-section. This type of geometry may be used to produce a container neck interior having a shape like that illustrated in FIG. 15.

Figure 5:
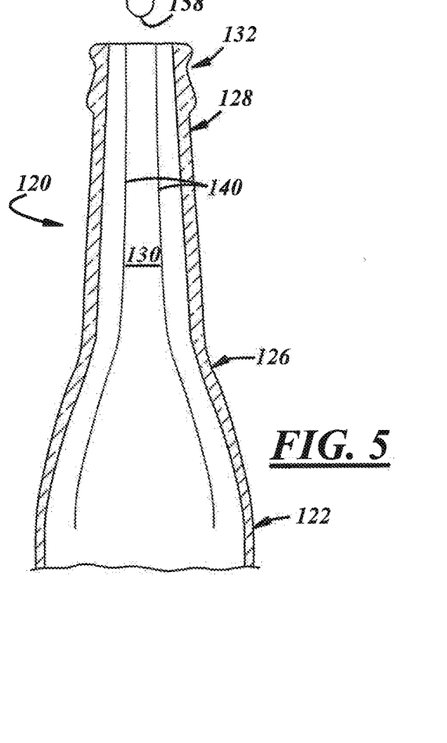
FIG. 5 is a fragmentary cross-sectional elevational view of a bottle having a vented neck in accordance with another illustrative embodiment of the present disclosure.

Also in this embodiment, and also with reference to FIG. 5, because the press-and-blow plunger 150 (FIG. 4) extends deep into the parison, grooves 140 will be formed not only in the container neck interior 130 but also can be formed throughout the entire length of the bottle neck 128 and shoulder 126 and partially into the rest of the body 122. In other embodiments, the length of the groove forming portion 160 (FIG. 4) can be selected to correspond to a desired length of the grooves in the bottle 120. For example, the grooves 140 can extend partially into the shoulder 126, or only partially into the neck 128 below a container neck finish 132. Accordingly, the plunger groove length is sufficient to form grooves in a portion of a neck interior 130 axially corresponding to the neck finish 132, and at least a portion of the rest of the neck interior 130 below the neck finish 132.

Figure 6:
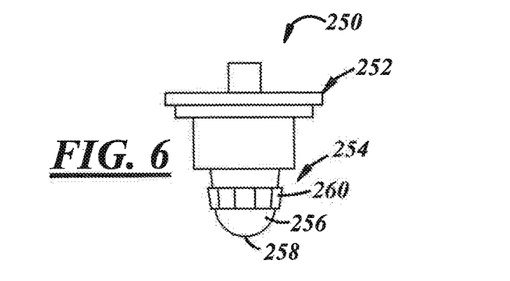
FIG. 6 is a front elevational view of a blow-and-blow plunger in accordance with an illustrative embodiment of the present disclosure.

In another illustrative embodiment, and with reference to FIG. 6, a blow-and-blow plunger 250 includes a base 252 and a forming body 254 extending from the base 252 and including a smooth conical portion 256 terminating in a rounded tip 258, and a groove forming portion 260 between the tip 258 and the base 252. In a blow-and-blow process, the forming body 254 typically forms just a short neck interior portion of a parison used to form a bottle. Accordingly, the groove forming portion 216 is used to form grooves in the parison that ultimately become grooves in a bottle after the parison is blown into the shape of the bottle. In this example, the groove forming portion 260 has a fluted cross-sectional shape. As used herein, the term cross-section means a section taken perpendicular to a longitudinal axis. This type of geometry may be used to produce a container neck interior having a shape like that illustrated in FIGS. 10A and 10B.

Figure 7:
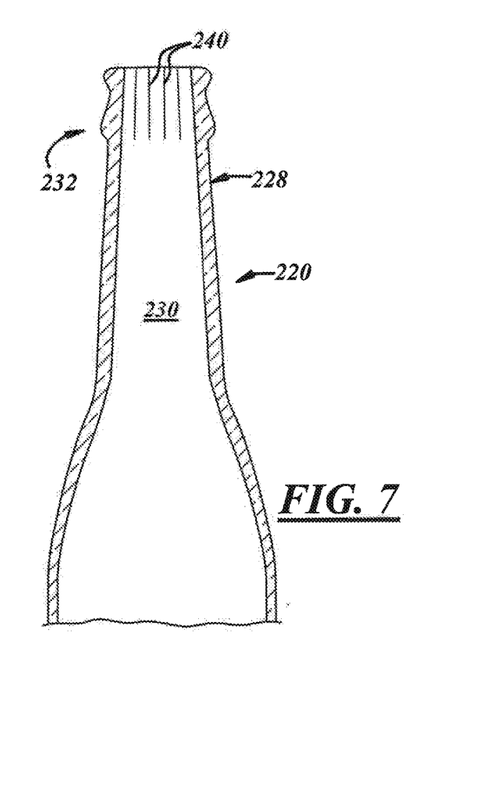
FIG. 7 is a fragmentary cross-sectional elevational view of a bottle having a vented neck in accordance with a further illustrative embodiment of the present disclosure.

Also in this embodiment, and with reference to FIG. 7, because the blow-and-blow plunger extends shallow into the parison, grooves 240 will be formed in corresponding portion of the container neck interior 230 of a bottle neck 228. In some embodiments, the height and/or length of the groove forming portion 260 of the plunger body 254 may be configured such that the grooves 240 extend partially into the container neck 228 at least into a portion of the neck interior 230 axially corresponding to a neck finish 232.

In either embodiment, the presently disclosed tooling and method can produce the internal axial features taller or longer than would be possible with embossments or debossments in a blank mold, for example, as disclosed in U.S. Patent Application Publication 2010/0264107.

FIGS. 8A through 33 illustrate several other illustrative embodiments of longneck bottles having vented necks. These embodiments are similar in many respects to the embodiment of FIGS. 1 through 7, and like numerals between the embodiments generally designate like or corresponding elements throughout the several views of the drawing figures. Accordingly, the descriptions of all of the embodiments are incorporated into one another. Additionally, the description of the common subject matter generally may not be repeated here.

Figure 8A:
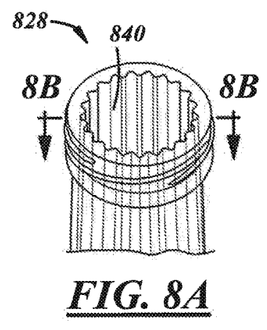
FIG. 8A is a fragmentary perspective view of a bottle having a vented neck in accordance with yet another illustrative embodiment of the present disclosure.
Figure 8B:
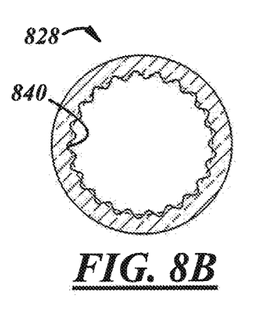
FIG. 8B is a cross-sectional view of the bottle of FIG. 8A.

FIGS. 8A and 8B illustrate a vented bottle neck 828 that is fluted to include an undulating circumferential profile having twenty-one grooves or flutes 840.

Figure 9A:
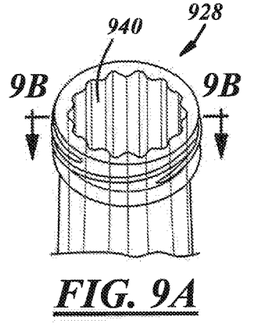
FIG. 9A is a fragmentary perspective view of a bottle having a vented neck in accordance with yet another illustrative embodiment of the present disclosure.
Figure 9B:
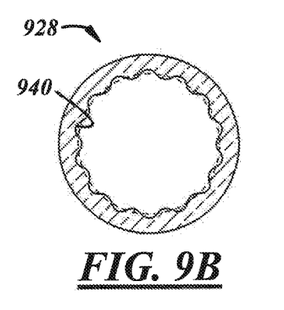
FIG. 9B is a cross-sectional view of the bottle of FIG. 9A.

FIGS. 9A and 9B illustrate a vented bottle neck 928 that is fluted to include an undulating circumferential profile having fourteen grooves or flutes 940.

Figure 10A:
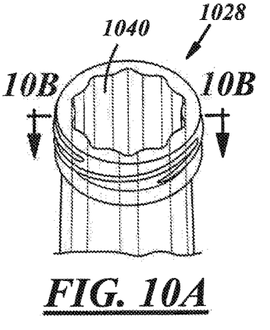
FIG. 10A is a fragmentary perspective view of a bottle having a vented neck in accordance with yet another illustrative embodiment of the present disclosure.
Figure 10B:
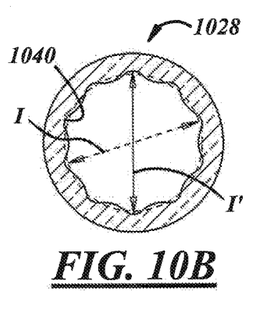
FIG. 10B is a cross-sectional view of the bottle of FIG. 10A.

FIGS. 10A and 10B illustrate a vented bottle neck 1028 that is fluted to include an undulating circumferential profile having ten grooves or flutes 1040.

Figure 11:
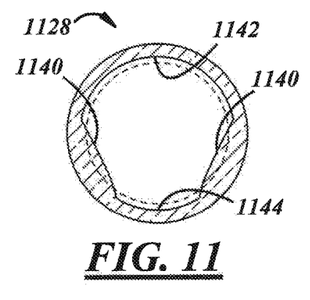
FIGS. 11 through 33 are cross-sectional views of bottles having vented necks in accordance with other illustrative embodiments of the present disclosure.

FIG. 11 illustrates a vented bottle neck 1128 and that is lobed to include a clamshell shaped profile. For example, the clamshell shaped profile may have a first circular portion 1142, a second, smaller circular portion 1144, and tangential lobes 1140 connecting the circular portions 1142, 1144. The tangential lobes 1140 may be straight or curved.

Figure 12:
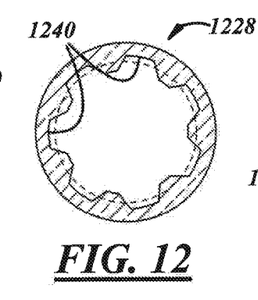

FIG. 12 illustrates a vented bottle neck 1228 that is fluted to include a spline or cog shaped profile. For example, the cog shaped neck interior includes seven grooves or flutes 1240, but may include any suitable quantity of grooves or flutes.

Figure 13:
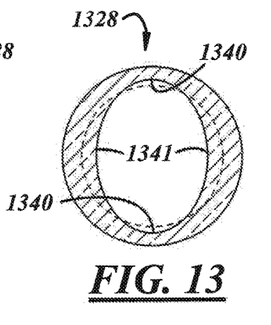

FIG. 13 illustrates a vented bottle neck 1328 that is fluted to include an elliptical shaped profile. For example the elliptical shaped neck interior may include opposed long sides 1341 and opposed short sides 1340 connecting the opposed long sides 1341. Although, the internal surface of the neck 1328 may be elliptical in cross section, the external surface of the neck 1328 may be circular in cross section.

Figure 14:
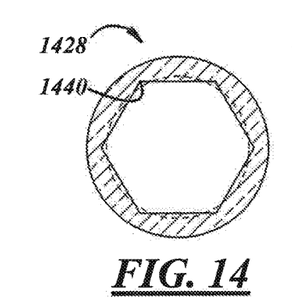

FIG. 14 illustrates a vented bottle neck 1428 that is fluted to include a hexagonal shaped profile, including apexes 1440.

Figure 15:
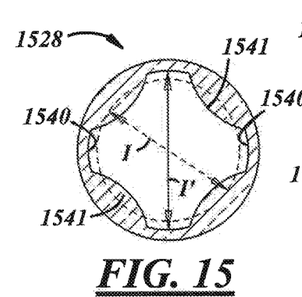

FIG. 15 illustrates a vented bottle neck 1528 that is fluted to include a generally cross shaped profile and, more particularly, a filleted cross shaped profile. For example, the cross shaped neck interior may include two pairs of opposed circular portions 1540 and excurvate fillets 1541 between the circular portions 1540.

Figure 16:
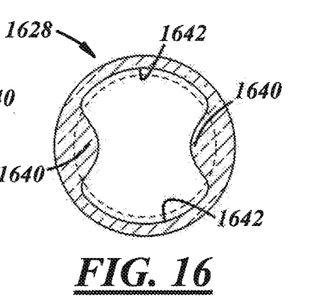

FIG. 16 illustrates a vented bottle neck 1628 that is lobed to include a generally badge shaped profile. For example, the badge shaped neck interior may include opposed circular portions 1642 and excurvate fillets 1640 between the circular portions 1642.

Figure 17:
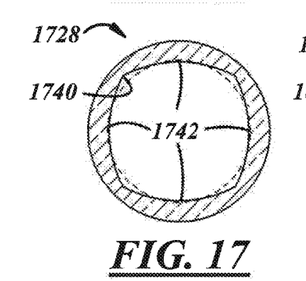

FIG. 17 illustrates a vented bottle neck 1728 that is fluted to include a generally square shaped profile and, more particularly, a rounded off square shaped profile. For example, the square shaped neck interior may include two pairs of opposed incurvate portions 1742 and apexes 1740 therebetween.

Figure 18:
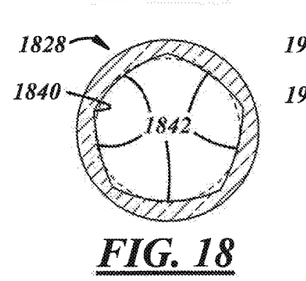

FIG. 18 illustrates a vented bottle neck 1828 that is fluted to include a generally pentagon shaped profile and, more particularly, a rounded off pentagon shaped profile. For example, the pentagon shaped neck interior may include five incurvate sides 1842 and apexes 1840 therebetween.

Figure 19:
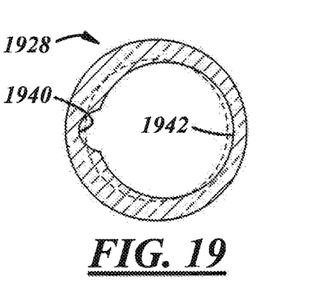

FIG. 19 illustrates a vented bottle neck 1928 that is fluted to include a keyway shaped profile. For example the keyway shaped neck interior may include a circular portion 1942 and a rounded keyway portion 1940 overlapping the circular portion 1942.

Figure 20:
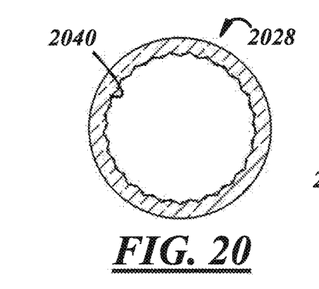

FIG. 20 illustrates a vented bottle neck 2028 that is fluted to include a sawtooth shaped profile. For example the sawtooth shaped neck interior may include twenty-five grooves or flutes 2040.

Figure 21:
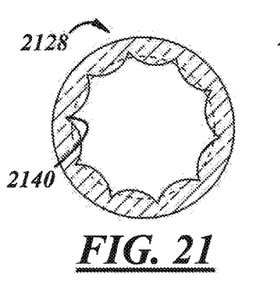

FIG. 21 illustrates a vented bottle neck 2128 that is fluted to include a sun shaped profile, for example, which may include ten grooves or flutes 2140. In this example the grooves include sharp apexes, in contrast to the smooth apexes shown in FIGS. 8A through 10B.

Figure 22:
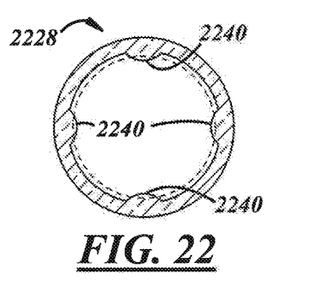

FIG. 22 illustrates a vented bottle neck 2228 that is lobed. For example, the lobed bottle neck interior has two pairs of diametrically opposed radially inwardly projecting lobes 2240.

Figure 23:
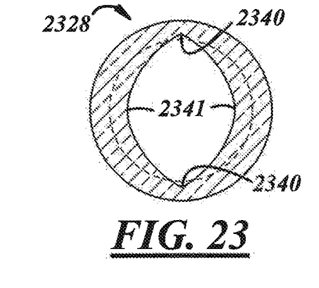

FIG. 23 illustrates a vented bottle neck 2328 that is fluted to include incurvate sides 2341 that intersect to establish diametrically opposed grooves and flutes 2340 with acute apexes.

Figure 24:
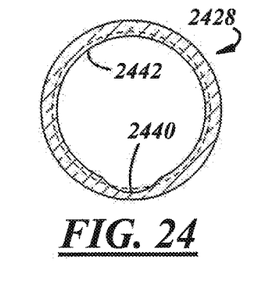

FIG. 24 illustrates a vented bottle neck 2428 that is fluted to include a keyway shaped profile similar to that shown in FIG. 19. For example, the keyway shaped neck interior may include circular portion 2442 and a rounded keyway portion 2440 overlapping the circular portion 2442.

Figure 25:
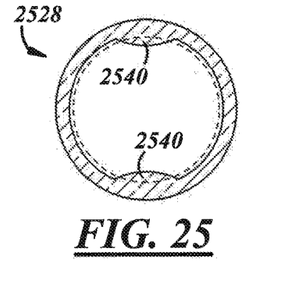

FIG. 25 illustrates a vented bottle neck 2528 that is lobed to include a generally badge shaped profile similar to that of FIG. 16 but with somewhat less pronounced radially inwardly projecting lobes 2540.

Figure 26:
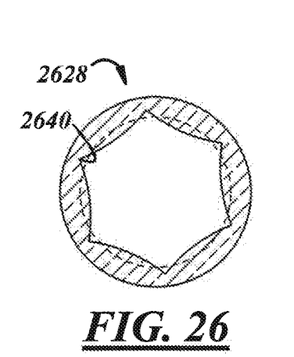

FIG. 26 illustrates a vented bottle neck 2628 similar to that illustrated in FIG. 14 and/or FIG. 21 but with only six grooves or flutes 2640 wherein the grooves have sharp apexes.

Figure 27:
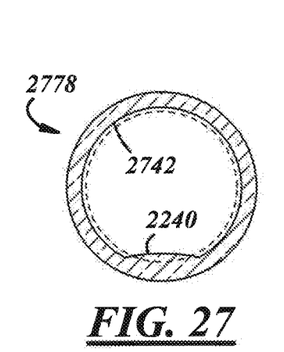

FIG. 27 illustrates a vented bottle neck 2728 that is lobed. For example, the lobed profile includes a circular portion 2742 and a lobe 2740 projecting radially inwardly and having and an excurvate surface.

Figure 28:
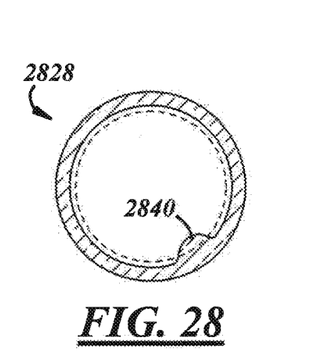

FIG. 28 illustrates a lobed bottle neck 2828 similar to that of FIG. 27. In this embodiment however, the lobed profile includes a more pronounced lobe 2840.

Figure 29:
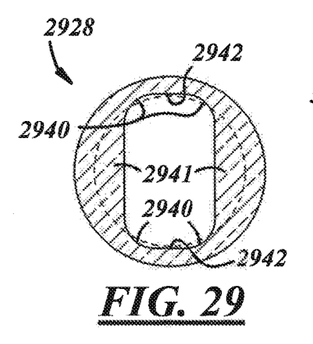

FIG. 29 illustrates a vented bottle neck 2928 that is fluted to include a generally rectangular shape and, more particularly, a filleted rectangular profile. For example, the rectangular shaped neck interior includes diametrically opposed short sides 2942 in diametrically opposed long sides 2941 connecting the short sides 2942 by incurvate fillets 2940.

Figure 30:
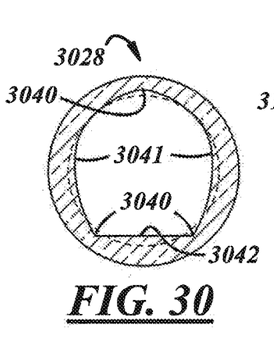

FIG. 30 illustrates a vented bottle neck 3028 that is fluted to include a generally archway shaped profile and, more particularly, a filleted archway shaped profile. For example, the archway shaped neck interior includes opposed incurvate portions 3041 and a straight portion 3042 connecting the opposed excurvate portions 3041, and apexes 3040 therebetween.

Figure 31:
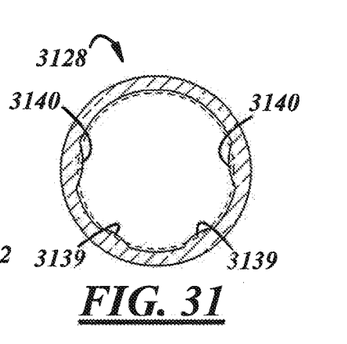

FIG. 31 illustrates a lobed bottle neck 3128 having a pair of diametrically opposed radially inwardly extending lobes 3140, and a pair of adjacent radially inwardly extending lobes 3139 on one side of the opposed lobes 3140.

Figure 32:
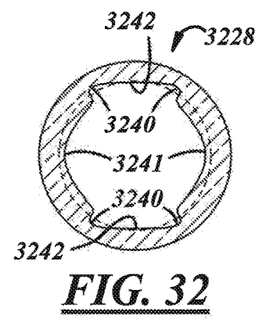

FIG. 32 illustrates a vented bottle neck 3228 that is fluted to include a generally lantern shaped profile. For example, the lantern shaped profile may include diametrically opposed incurvate portions 3241 and diametrically opposed crown portions 3242 between and connecting the incurvate portions 3241, and incurvate fillets 3240.

Figure 33:
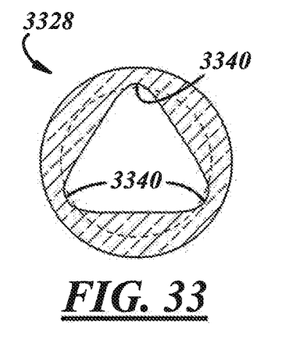

FIG. 33 illustrates a vented bottle neck 3328 that is fluted to include a generally triangular shaped profile and, more particularly, a filleted triangular shaped profile. For example, the triangular shaped neck interior includes three apexes 3340, which may be rounded or filleted.

Figure 34A:
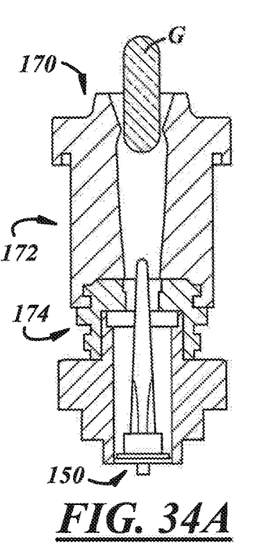
FIGS. 34A-34E are schematic views of a press-and-blow process and tooling according to an illustrative embodiment of the present disclosure.
Figure 34B:
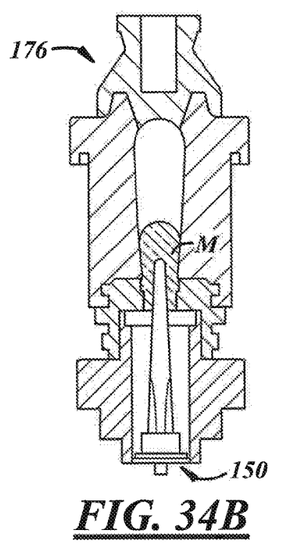
Figure 34C:
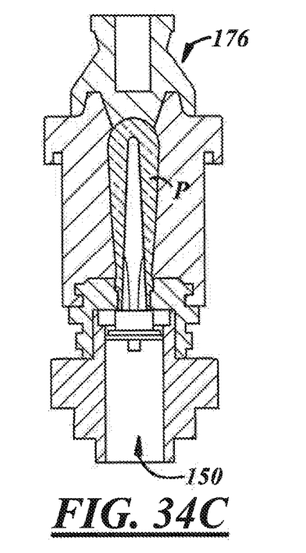
Figure 34D:
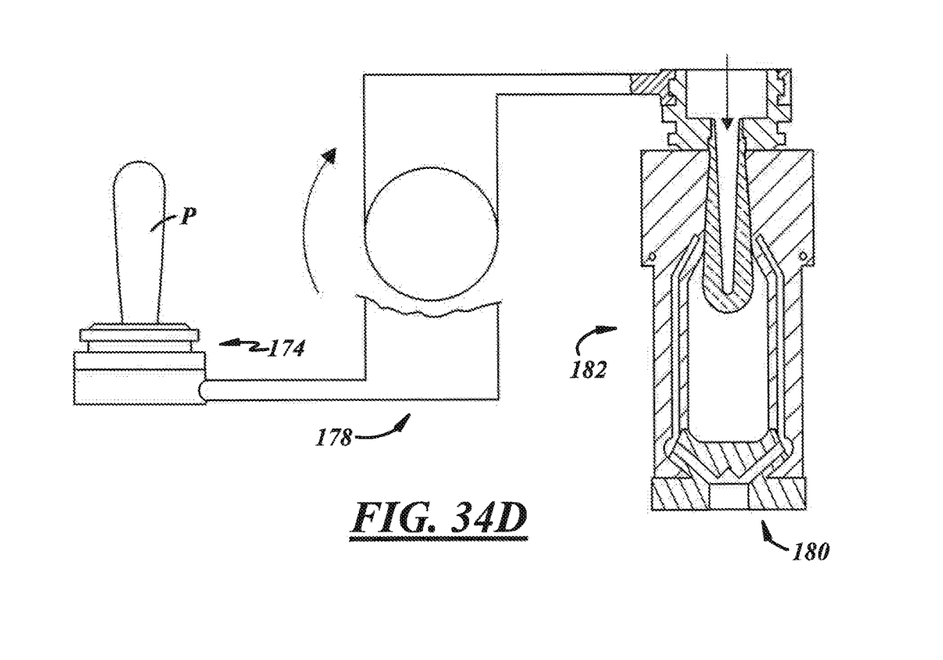
Figure 34E:
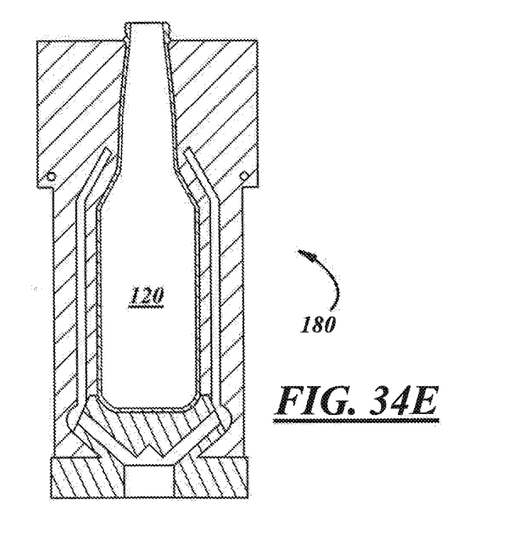

FIGS. 34A-34E illustrate an example press and blow container manufacturing process and tooling including a blank side (FIGS. 34A-34C), a blow side (FIGS. 34D-34E), and a transfer stage therebetween (FIG. 34D). On the blank side, in FIG. 34A, a gob G of molten glass is illustrated being dropped into an open parison mold or blank mold 170 including a blank mold body 172, a neck ring 174, and the press and blow plunger 150. Next, in FIG. 34B, a baffle 176 is shown in position closing the blank mold 170, wherein molten glass M is shown settled in the bottom of the blank mold 170 around the plunger 150. Subsequently, in FIG. 34C, the plunger 150 is shown in a fully extended position, wherein a parison P is formed around the plunger 150 within the blank mold body 172. At the transfer stage, in FIG. 34D, a transfer mechanism 178 inverts the parison P and the neck ring 174 carrying the parison P and delivers them to the blow side. On the blow side, the parison P is shown within a blow mold 180 including a blow mold body 182, wherein blow gas is delivered through the neck ring into an interior of the parison P. Thereafter, in FIG. 34E, the bottle 120 is shown fully blown and stretched within the blow mold 180 and the neck ring has been removed so that the blow mold 180 can be opened and the bottle 120 removed.

Figure 35A:
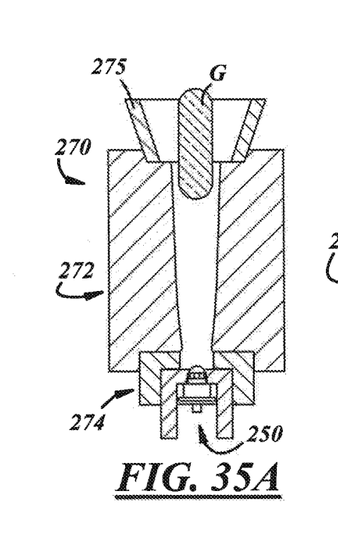
FIGS. 35A-35E are schematic views of a blow-and-blow process and tooling according to an illustrative embodiment of the present disclosure.
Figure 35B:
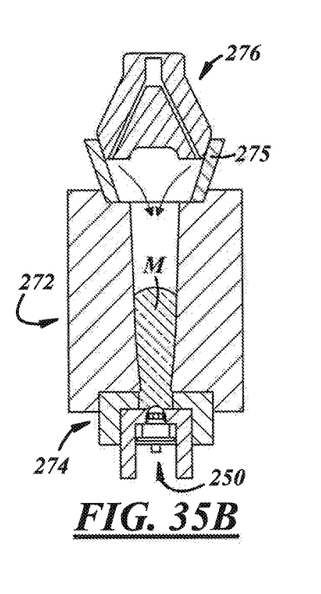
Figure 35C:
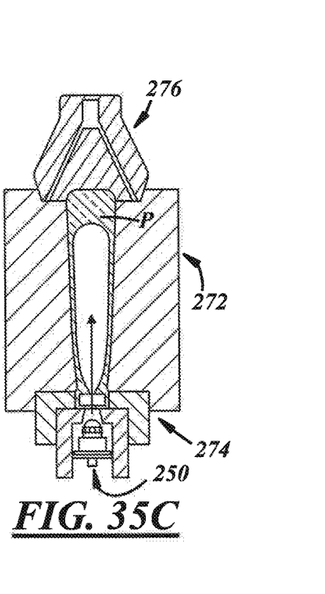
Figure 35D:
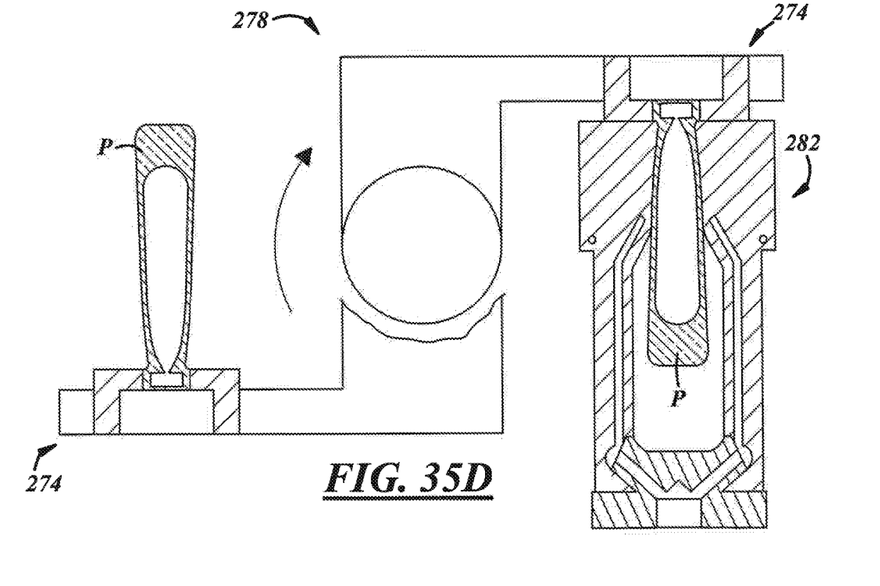
Figure 35E:
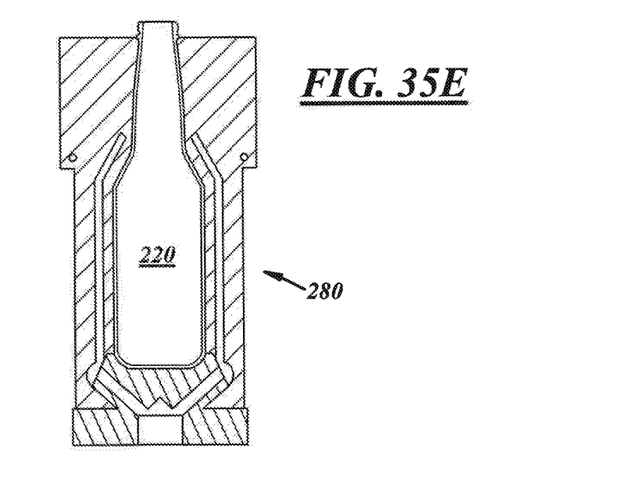

FIGS. 35A-35E illustrates an example blown blow container manufacturing process including a blank side (FIGS. 35A-35C), a blow side (FIGS. 35D-35E), and a transfer stage therebetween (FIG. 35D). On the blank side, in FIG. 35A, a gob G of molten glass is illustrated being dropped into an open parison mold or blank mold 270 including a blank mold body 272, a neck ring 274, and the blow-and-blow plunger 250. Next, in FIG. 35B, a baffle 276 is shown in position in contact with a funnel 275 and communicating settle gas against molten glass M, wherein the molten glass M settles at the bottom of the mold 270 within the neck ring 274 and against the plunger 250. Subsequently, in FIG. 35C, the plunger 250 is shown in a retracted position to allow counter blow gas to enter the molten glass and establish a parison P having an interior cavity formed by the counter blow gas and exterior surfaces in contact with interior surfaces of the blank mold body 272 and the baffle 276. At the transfer stage, in FIG. 35D, a transfer mechanism 278 inverts the parison P and the neck ring 274 carrying the parison P and delivers them to the blow side. On the blow side, the parison P is shown within a blow mold including a blow mold body 282, wherein blow gas is delivered through the neck ring 274 into the interior of the parison P. Thereafter, in FIG. 35E, the bottle 220 is shown fully blown and stretched within the blow mold 280 and the neck ring has been removed so that the blow mold 280 can be opened in the bottle 220 removed.

There thus has been disclosed a bottle, press-and-blow and blow-and-blow glass bottle manufacturing methods, and related tooling that fully satisfy all of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. The disclosure is intended to embrace all such modifications and variations as fall within the spirit and broad scope of the appended claims.

The invention claimed is:

1. A method of a making a glass container that includes the steps of:
(a) forming a parison from a gob of molten glass around a plunger in a blank mold having a neck ring, wherein the parison includes a body, a neck having a neck finish and a neck interior, and wherein at least a portion of the plunger has a non-circular cross-section to form both a portion of the neck interior corresponding to the neck finish and a portion of the neck interior between the neck finish and the body of the parison with a corresponding non-circular cross-section; and (b) blowing the parison in a blow mold to form the container, which has the neck interior of non-circular cross-section wherein the non-circular cross-section is lobed and includes a profile having a first circular portion, a second and smaller circular portion, and tangent lobes connecting the circular portions.

2. The method set forth in claim 1, wherein the method is a press-and-blow process and the plunger is a press plunger such that step (a) includes pressing the press plunger into the molten glass to form the parison neck within neck rings and the parison body having a cavity formed by outer surfaces of the plunger and outer surfaces formed against inside surfaces of the blank mold.

3. The method set forth in claim 1, wherein the plunger includes a base, a conical portion terminating in a tip, and a non-circular forming portion between the base and tip.

4. The method set forth in claim 1, wherein the method is a blow-and-blow process and the plunger is a blow plunger such that step (a) includes forcing the gob around the blow plunger to at least partially form the neck finish and the neck interior of non-circular cross-section and blowing gas into the neck interior to form the parison body having a cavity formed by the gas and having outer surfaces formed against inside surfaces of the blank mold.

5. The method set forth in claim 1, wherein the neck ring has internal surfaces for forming the neck finish including an external closure attachment diameter of not more than 36 mm.

6. The method set forth in claim 1, wherein the blowing step (b) also includes blowing the parison in the blow mold to form the glass bottle also having a bottle body, a bottle shoulder between the neck finish and the bottle body, and a bottle neck extending between the bottle shoulder and the neck finish, and wherein at least a portion of the bottle shoulder includes the at least one internal axial feature.

7. The method set forth in claim 6, wherein the at least a portion of the bottle body includes the at least one internal axial feature.

8. A bottle produced by the method set forth in claim 7.

9. A bottle produced by the method set forth in claim 6.

10. A bottle produced by the method set forth in claim 1.

11. The method set forth in claim 1, wherein the lobed non-circular cross-section includes at least one of a clamshell shaped profile, a badge shaped profile, or a profile including radially inwardly projecting rounded lobes.

12. The method set forth in claim 1, wherein the forming step forms the neck finish to have a wall thickness that is circumferentially and radially continuous.

13. The method set forth in claim 1, wherein the forming step forms the neck finish to have a wall thickness having no discontinuities.

14. The method set forth in claim 1, wherein the at least a portion of the plunger has a non-circular cross-section to form at least a portion of the neck interior and at least a portion of the body of the parison with a corresponding non-circular cross-section.

15. The method set forth in claim 1, wherein the parison formed in the forming step also includes a shoulder extending between the body and the neck, and further wherein the at least a portion of the plunger has a non-circular cross-section to form at least a portion of the neck interior and at least a portion of the shoulder with a corresponding non-circular cross-section.

16. The method set forth in claim 1, wherein the tangent lobes connecting the circular portions of the profile of the non-circular cross-section are straight.

17. A method of a making a glass container that includes the steps of:

(a) forming a parison from a gob of molten glass around a plunger in a blank mold having a neck ring, wherein the parison includes a body, a neck having a neck finish and a neck interior, and wherein at least a portion of the plunger has a non-circular cross-section to form both a portion of the neck interior that corresponds to the neck finish and a portion of the neck interior between the neck finish and the body of the parison with a corresponding non-circular cross-section; and (b) blowing the parison in a blow mold to form the container, which has the neck interior of non-circular cross-section.

18. The method set forth in claim 17, wherein the blowing step (b) also includes blowing the parison in the blow mold to form the glass bottle also having a bottle body, a bottle shoulder between the neck finish and the bottle body, and a bottle neck extending between the bottle shoulder and the neck finish, and wherein at least a portion of the bottle shoulder includes the at least one internal axial feature.

19. A bottle produced by the method set forth in claim 17.

20. The method set forth in claim 17, wherein the at least a portion of the plunger has a non-circular cross-section to form at least a portion of the neck interior and at least a portion of the body of the parison with a corresponding non-circular cross-section.

21. The method set forth in claim 17, wherein the parison formed in the forming step also includes a shoulder extending between the body and the neck, and further wherein the at least a portion of the plunger has a non-circular cross-section to form at least a portion of the neck interior and at least a portion of the shoulder with a corresponding non-circular cross-section.

* * * * *